United States Patent [19]

Kohama et al.

[11] Patent Number: 4,882,924

[45] Date of Patent: Nov. 28, 1989

[54] METHOD AND APPARATUS FOR MANUFACTURING HOLLOW CYLINDRICAL GUIDE ROLLER FOR MAGNETIC RECORDING TAPE

[75] Inventors: Takayuki Kohama; Hideo Kojima, both of Yokohama, Japan

[73] Assignee: Sanshin Industry Co., Ltd., Yokohama, Japan

[21] Appl. No.: 99,794

[22] Filed: Sep. 22, 1987

[51] Int. Cl.⁴ .................. B21C 23/14; B21D 28/28; B21D 45/06; B21K 21/12

[52] U.S. Cl. .................................. 72/254; 72/264; 72/334; 72/344; 72/356; 72/354

[58] Field of Search ............... 72/254, 267, 353, 354, 72/356, 359, 264, 345, 344, 463, 327, 332–334; 82/685

[56] References Cited

U.S. PATENT DOCUMENTS

| | | | |
|---|---|---|---|
| 1,642,736 | 9/1927 | Lyman | 72/354 |
| 1,819,254 | 8/1931 | Mantle | 72/256 |
| 2,901,995 | 9/1959 | Lavigne | 72/344 |
| 2,904,173 | 9/1959 | Braun et al. | 72/267 |
| 3,078,566 | 2/1963 | Egan | 72/267 |
| 3,101,534 | 8/1963 | Lange | 72/254 |
| 3,108,502 | 10/1963 | Chatfield | 72/354 |
| 3,138,257 | 6/1964 | Andersen | 72/354 |
| 3,186,209 | 6/1965 | Friedman | 72/356 |
| 3,491,576 | 1/1970 | Oguri et al. | 72/356 |
| 3,654,796 | 4/1972 | Dunn | 72/345 |
| 3,835,686 | 9/1974 | Lawson et al. | 72/354 |
| 3,871,200 | 3/1975 | Onoda et al. | 72/41 |
| 4,197,757 | 4/1980 | Hackett | 72/264 |
| 4,291,568 | 9/1981 | Stifano | 72/356 |

FOREIGN PATENT DOCUMENTS

| | | | |
|---|---|---|---|
| 202423 | 3/1959 | Austria . | |
| 84075325 | 3/1984 | Fed. Rep. of Germany . | |
| 1339449 | 8/1963 | France | 72/345 |
| 55-142454 | 1/1981 | Japan . | |
| 127536 | 8/1982 | Japan | 72/267 |
| 57-127951 | 8/1982 | Japan . | |
| 733797 | 5/1980 | U.S.S.R. | 72/345 |

*Primary Examiner*—Lowell A. Larson
*Attorney, Agent, or Firm*—Brown, Martin, Haller & McClain

[57] ABSTRACT

A method for manufacturing a hollow tape guide for guiding magnetic recording tape. In this method, a round rod-like metal wire is sheared by shearing cutters into a blank a predetermined length, having a first end and a second end. Then, the blank is shaped and made into a blank having a shallow recess in the second end. The blank is then extruded and made into a cup-shaped blank closed at the first end by a bottom and having a predetermined length and a predetermined wall thickness. Finally, the bottom of the cup-shaped blank is punched out, thereby providing a hollow tape guide. The bottom is thick when the rod-like blank is too long, and is thin when the rod-like blank is too short, so that the cup-shaped blank may have the desired length and desired wall thickness.

6 Claims, 2 Drawing Sheets

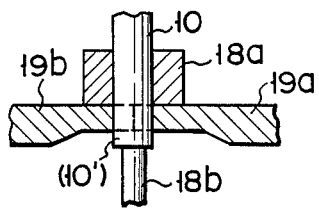
F I G. 5A
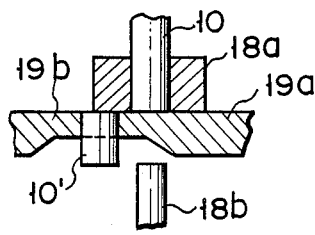
F I G. 5B
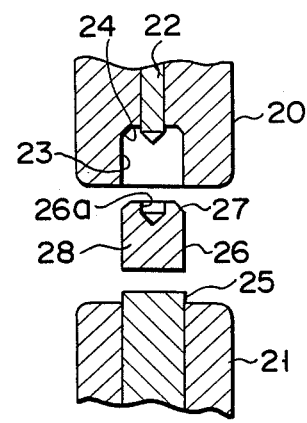
F I G. 6
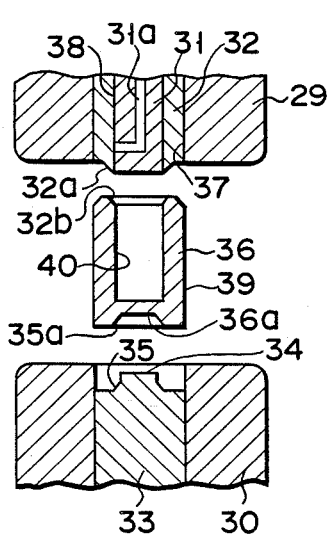
F I G. 7
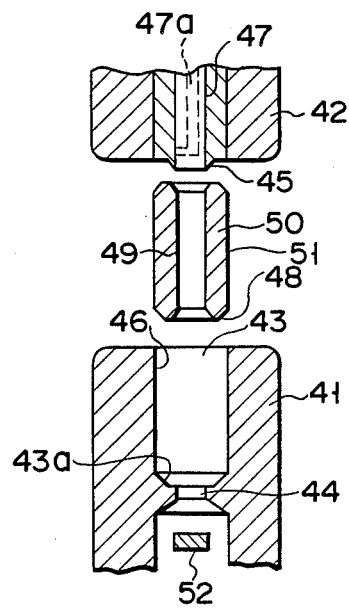
F I G. 8

METHOD AND APPARATUS FOR MANUFACTURING HOLLOW CYLINDRICAL GUIDE ROLLER FOR MAGNETIC RECORDING TAPE

BACKGROUND OF THE INVENTION

The present invention relates to a method and an apparatus for manufacturing, from a round rod-like metal wire, a hollow cylindrical tape guide for guiding magnetic recording tape, such as video tape or audio tape.

FIG. 1 shows cassette A containing a roll of magnetic recording tape (e.g., video tape or audio tape) and two tape guide rolls P for guiding the tape. Three methods of manufacturing tape guides P are known. In the first method, a thin blank punched out of a large thin metal plate is rolled into a hollow cylindrical roller. In the second method, a long metal pipe is cut into a short piece having a predetermined length, by means of sawing or grinding, and the short pipe is machined. The third method, which is disclosed in Japanese Patent Disclosure No. Sho 57-127951, comprises the following steps. First, as shown in FIG. 2, blank 1 (i.e., a round metal rod) is inserted into an opening of stationary die 2. Then, as is shown in FIG. 3, stepped punches 3 and 4 are pushed forward, one from each end of blank 1, until their stepped portion reach the ends of blank 1. In this way, a hollow cylindrical tape guide is formed which has thin wall 6 at the center and two holes. These holes are identical in shape and size to the end portions of punches 3 and 4.

The first method is difficult to perform. The second method is disadvantageous in two respects. First, when the metal pipe is sawed or ground, chips or dust will be formed, thus wasting the material. Secondly, a chamfering machine must be used to remove the burrs formed on the sawed surface.

The third method can indeed provide a tape guide having two holes having desired depth and diameter, but cannot always provide a tape guide having desired length and will thickness. More specifically, when blank 1 is too short, the tape guide will be to short, and wall 6 will be too thin. Conversely, when blank 1 is too long, the tape guide will be too long, and wall 6 will be too thick. In other words, the size of the tape guide changes in accordance with the length of blank 1. Further, the longer the blank, the greater pressure will be applied to die 2 as punches 3 and 4 are pushed into blank 1, one from each end of blank 1. In the worst case, die 2 may be broken. Moreover, due to wall 6 formed at the center of the tape guide, the entire tape guide cannot be mounted on a pin protruding from the bottom of cassette A. In order to mount the entire tape guide on the pin, wall 6 can be removed. When wall 6 is removed, however, burrs will be formed on the inner periphery of the tape guide. These burrs prevent the tape guide from smoothly mounting on the pin and, thus, from smoothly guiding the magnetic recording tape. Hence, the burrs must be removed.

SUMMARY OF THE INVENTION

Accordingly, the object of the present invention is to provide a method and an apparatus for manufacturing a hollow cylindrical tape guide easily at low cost which has desired size and shape, can easily be mounted on a pin or the like, and can smoothly guide magnetic recording tape.

According to the present invention, there is provided a method for manufacturing a hollow tape guide for guiding magnetic recording tape, comprising the steps of: (a) shearing a blank of a predetermined length, having a first end and a second end, from a round rod-like metal wire; (b) extruding the blank into a cup-shaped blank closed at the first end and having a predetermined length and a predetermined wall thickness; and (c) punching out the closed end of the cup-shaped blank.

In the method of this invention, no chips are formed in cutting a blank from the round rod-like metal wire since the rod is sheared, not sawed. Hence, there is no waste of material. Further, the cup-shaped blank made by extruding the solid blank has a thick bottom when the solid blank is longer than desired, and a thin bottom when the solid blank is shorter than desired. The bottom is removed by means of punching, thereby forming a hollow cylindrical tape guide. Therefore, the tape guide can have an accurate size even if the solid blank provided from a solid round metal rod by means of shearing is either too long or too short.

BRIEF DESCRIPTION OF THE DRAWINGS

FIGS. 5A and 5B are a schematic view showing the state that a solid round rod-like blank is formed from a metal wire;

FIGS. 6 and 7, are schematic views of the states that the blank, is shaped and extruded; and FIG. 8 is a schematic view of the state that the bottom wall formed by extruding is punched.

DETAILED DESCRIPTION OF THE PREFERRED EMBODIMENTS

A method for manufacturing a tape guide according to a embodiment of the present invention will be described in detail with reference to FIGS. 4 to 8. A tape guide manufactured in this embodiment has 16 mm long, 6.1 mm of outer diameter and 4.8 mm of inner diameter.

Figure 1:
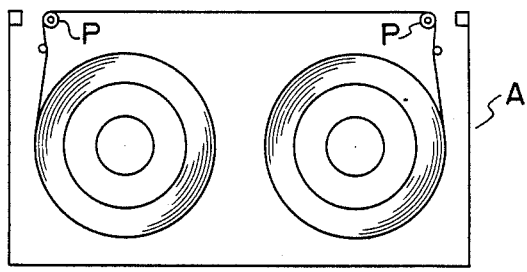
FIG. 1 is a schematic disposition diagram of a tape cassette.
Figure 2:
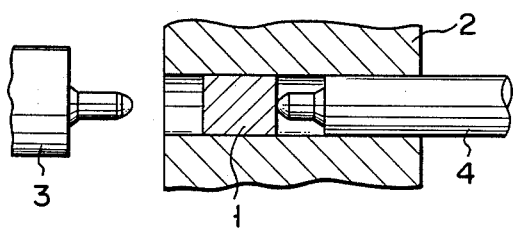
FIGS. 2 and 3 are schematic sectional views showing a conventional method of forming a tape guide.
Figure 3:
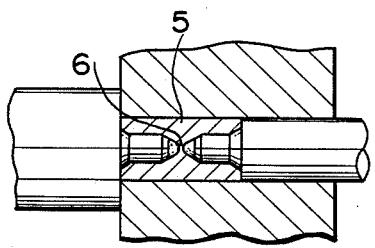
Figure 4:
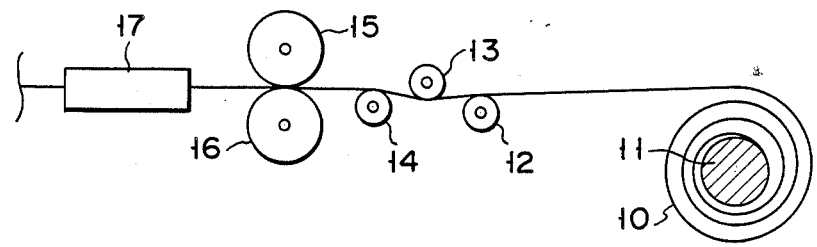
FIG. 4 is a schematic view of the state that a wire is linearly rolled according to an embodiment of the present invention.

As shown in FIG. 4, a tape guide is formed from a solid round rod-like long slender metal wire 10 wound on core 11. Wire 10 is preferably made of copper alloy of nonmagnetic ductile material, and may also made of aluminum, aluminum alloy, or austenite stainless steel. The diameter of wire 10 can be selected according to a predetermined size of the tape guide. In this embodiment, wire 10 is made of copper alloy.

In FIG. 4, wire 10 is initially drawn from core 11, and substantially straightened through guide rolls 13, 13, 14 and feed rolls 15, 16. The wire passed through the respective rolls is further fed through guide 17 to next cutting step.

As shown in FIG. 5A, material 10 is passed through a cavity of die 18a. The length of rod blank 10' to be cut from wire 10 defined by positioning pin 18b, and is clamped by cutter halves 19a, 19b. Thereafter, as shown in FIG. 5B, the material 10 is sheared by shearing cutters 19a, 19b, which are moved in transverse direction, to round rod blank 10' having a first end and a second end in the cutting step. Hence, there is no loss of material.

Then, the round rod blank is extruded to blank 26 having a shallow cylindrical recess 26a on the second end, i.e., the upper end as shown in FIG. 6.

The blank is formed by a first die set having a stationary die 20 and a movable die 21 as shown in FIG. 6. Die 20 has recess 23 formed in a smooth cylindrical shape on its inner peripheral surface, and oblique surface 24 formed at the peripheral edge of the upper end of recess 23. Punch 22 is protruded to recess 23. Punch 22 can be protruded by a knock-out mechanism, not shown, from the shown position further into recess 23.

Punch 25 is disposed at the center of die 21, and the end of punch 25 is protruded from the upper surface of die 21.

When shaping the blank in FIG. 6, the round rod blank cut in the shearing step in FIG. 5 is disposed in recess 23 of die 20, and die 21 is pressed to die 20. Thus, as shown, blank 26 having shallow recess 26a at the second end of the upper end is formed.

The outer edge of the upper end of blank 26 formed in this step is formed by oblique surface 24 of die 20 with chamfered portion 27, and outer peripheral surface 28 of blank 26 is smoothly finished by the smooth inner peripheral surface of recess 23 of die 20. Recess 26a of blank 26 can readily extrude in the next step to eliminate a damage at extruding step.

After blank 26 is thus formed, blank 26 is exhausted by punch 22 moving forward into recess 23.

As shown in FIG. 7, blank formed with the recess on the upper end is extruded to hollow cylindrical cup-like blank 36 having a bottom wall at the lower end, i.e., the first end, and predetermined peripheral wall length and wall thickness by a second die set having stationary die 29 and movable die 30.

Die 29 used in this step has inner hole 37 smoothly formed in a cylindrical inner periphery. In the inner hole are provided immovable punch 31 with respect to die 29 and axially movable die 32 surrounding the punch 31. Die 32 is energized downwardly. Outer peripheral surface 38 of punch 31 is formed in a smoothly cylindrical shape, and air vent slot 31a opened on the outer peripheral surface is extended axially therein. Oblique surface 32a is formed on the end, i.e., the lower end of die 32.

The inner diameter of inner hole 37 and the outer diameter of punch 31 are formed substantially equally to the outer diameter and the inner diameter of the tape guide.

Die 30 has an inner hole opened on its upper end, and movable punch 33 is axially disposed in the inner hole. Central end 34 of punch 33 is reduced in its diameter, projected upward, and frustoconical oblique surface 35 is formed on the periphery of the boundary between the central end and the peripheral base end of punch.

When extruding in FIG. 7, the blank extruded in FIG. 6 is disposed in the inner hole of die 30 in such a manner that the second end of the blank at the recess side is directed upward, and die 30 is pressed to die 29. Punch 33 is pushed towards die 29 to apply pressure on a first end of the blank while a lower pressure is applied to the opposite end of the blank with annular die 32, which is biased towards the die 30. When punch 33 is pushed forward toward die 29, die 32 is pressed by the peripheral wall of the blank to move upward. The extruding amount of punch 33 is so determined that the length of cup-like blank 36 becomes substantially equal to the completed tape guide.

In the extruding step in FIG. 7, since punch 31 of die 29 does not move, cup-like blank 36 having a length substantially equal to that of the completed tape guide is extruded from the blank having the recess on the first end. The inner edge of the second end of blank 36 is formed by oblique surface 32a of cylinder 32 with chamfered portion 32b. Shallow recess 36a is formed on blank 36 by projection 34 of punch 33 on the first end of lower side of blank. The inner peripheral surface of recess 36a is formed by tapered surface 35 of projection 34 with chamfered tapered surface 35a. Outer and inner peripheral surfaces 39 and 40 of blank 36 are formed by inner hole 37 of die 29 and outer peripheral surface 38 of punch 31 in smooth cylindrical surfaces.

In the extruding step in FIG. 7 to form cup-like blank 36 having a length substantially equal to that of the completed tape guide, the bottom wall is thickly formed when blank 26 formed in the extruding step in FIG. 6 is large, and thinly formed when, on the contrary, small. The length and thickness of the peripheral wall are always formed constantly. In other words, this extruding step does not extrude so that the hollow volume of the inner hole becomes constant, but extrudes so that the wall thickness and length of the peripheral wall become constant. Therefore, the excessive quantity of the blanks can be regulated by the thickness of the bottom wall of the blank.

Blank 36 formed in this manner is exhausted from inner hole 37 of die 29 by moving die 32 downward reversely to that at extruding time. In this case, air vent slot 31a of punch 31 prevents the peripheral wall from deforming. Air enters the chamber defined between the end of punch 31 and the bottom of the cup shaped blank via the vent slot 31a, leaking between the opposing outer surface of the punch and inner surface of the cup shaped blank, which are not perfectly sealed, to reach the chamber.

In punching step in FIG. 8, the bottom wall of the cup-like blank is eventually punched by a third die set having stationary die 41 and movable die 42 to complete tape guide 50.

As shown in FIG. 8, die 41 has large-diameter inner hole 43 including a smooth inner peripheral surface, and small-diameter inner hole 44 opened at its one end with the large-diameter inner hole and at the other end with the exterior of die 41. Inner hole 44 is formed at the lower end of inner hole 43 side with tapered surface 43a. Inner hole 43 has a size so that completed tape guide 50 has 6.1 mm of diameter and 16 mm of length.

Die 42 has cylinder 45 axially movable in inner hole 43, and punch 47 disposed in cylinder 45 and axially movable with smooth outer peripheral surface. The lower end surface of cylinder 45 has the shape corresponding to the second end of blank 36, i.e., the upper side end of blank 36 shown in FIG. 7. Air vent slot 47a opened on the outer periphery of punch 47 is extended in punch 47, and the outer diameter of punch 47 has a size slightly smaller than the inner diameter of inner hole 44 of die 41.

When punching, the cup-like blank formed in the extruding step in FIG. 7 is disposed in inner hole 43 of die 41 so that the bottom wall is disposed downside, die 42 is pressed to die 41, and cylinder 45 is moved toward die 41. Thereafter, punch 47 is moved down. Since punch 47 has air vent slot 47a opened on the outer peripheral surface, punch 47 can be readily inserted. Air trapped in the chamber between the end of punch 47 and the bottom of the blank as the punch 47 is moved down will escape between the opposing outer surface of the punch and inner surface of the blank to reach the adjacent vent slot 47a, where it escapes to the atmosphere.

Thus, the bottom wall of blank 36 is punched as shown in FIG. 8, and the first end, i.e., outer edge 48 of the lower end is formed by tapered surface 43a of inner hole 43 in tapered surface 48. Inner and outer peripheral surfaces 49, 51 of guide 50 are smoothly formed by the corresponding peripheral surfaces of inner hole 43 and punch 47 to complete tape guide 50 of predetermined size and shape. Reference numeral 52 designates a bottom wall punched by punch 47.

The die and the punch used to extrude tape guide 50 may be suitably determined in size and shape according to the desired size of the tape guide.

When the tape guide was actually manufactured according to the method of the present invention by the inventors, the cutting loss of the wire was eliminated, and a chamfering machine was not required. When the round rod blank was shorter, bottom wall punched out became thin, and when longer, became thick. In both cases, the tape guide of predetermined size was always obtained. There occurred no defect of damaging tools such as dies.

What is claimed is:

1. A method of manufacturing a hollow tape guide made of non-magnetic ductile material for guiding magnetic recording tape, comprising the steps of:

shearing a blank of predetermined length, having a first end and a second end, from a round rod-like metal wire;

inserting the blank into a first bore in a first die containing a first punch;

moving a second die facing the first die and having a second punch aligned with the bore in the first die towards the first die to urge the second end of the blank against the first punch and forming a shallow cylindrical recess at said second end of the blank with the first punch;

inserting the blank having a shallow cylindrical recess into the bore of a third die containing an axially movable third punch such that the recess faces a fourth die which faces the third die, said fourth die having an annular cavity aligned with the bore of the third die and in which an axially movable annular die is arranged, a stationary punch being arranged at the center of the annular cavity and having a first vent slot extending axially along the stationary punch and communicating with said annular cavity;

moving the third die relative to the fourth die opposing the third die;

forming the blank into a cup-shaped blank closed at the first end and having a predetermined length and wall thickness by moving the third punch a predetermined distance relative to the fourth die to apply pressure on a first end of the blank to extrude it into the annular cavity in the fourth die while applying a lower pressure on the opposite end of the blank with the annular die;

supplying air into the cup-shaped blank via said vent slot from the atmosphere thereby preventing the blank from being deformed by negative pressure, and removing the cup-shaped blank from the annular cavity in the fourth die;

inserting said cup-shaped blank in a large diameter bore of a fixed fifth die with the closed end facing inwards, said fifth die having a small diameter bore communicating with the large diameter bore;

moving a sixth die arranged so as to face the fifth die, with respect to the fifth die, said sixth die having an axially movable punch and a vent slot formed in the movable punch;

punching out the closed end of the cup-shaped blank with the axially movable punch of the sixth die to form the hollow tape guide while exhausting the internal air of the cup-shaped blank to the atmosphere via the vent slot of said axially movable punch preventing deformation of the blank due to the air compression between the closed portion of the cup-shaped blank and the movable punch of the sixth die.

2. The method according to claim 1, wherein said step of forming the blank to one having the shallow cylindrical recess comprises chamfering the outer peripheral edge of the second end and smoothening the outer peripheral surface.

3. The method according to claim 2, wherein said step of forming the blank into one of cup-like form comprises chamfering the inner peripheral edge of the second end, smoothening the inner peripheral surface, and shaping a shallow recess surrounded by chamfered surface at the first end.

4. The method according to claim 3, wherein said step of punching the closed end comprises chamfering the outer peripheral edge of the first end of the blank.

5. The method according to claim 4, which further comprises:

the step of straightening the metal wire wound on a core before the step of shearing the blank from the wire.

6. An apparatus for manufacturing a hollow tape guide for guiding magnetic recording tape, comprising:

shearing cutters for shearing a round rod-like non-magnetic ductile metal wire, thereby forming a round rod-like blank of a predetermined length, said blank having a first end and a second end;

a first die set including a first die and a second die opposing each other and movable relative to each other so as to form a recess in the second end of the round rod-like blank, said first die having a recess in which the round rod-like blank can be inserted, and a punch protruding into the recess of the first die thereby to form a recess in the second end of the round rod-like blank, and said second die having a punch capable of pressing the first end of the round rod-like blank;

a second die set including a first die and a second die opposing to each other and movable relative to each other, thereby to extrude the round rod-like blank formed by said first die set into a hollow cylindrical blank closed at the first end by a bottom, said first die having a hole into which the round rod-like blank can be inserted, and a punch axially movable in the hole, and said second die having a hole aligned with the hole in the first die, a stationary punch being of smaller diameter than the hole to define an annular cavity into which the blank can be extruded, said stationary punch having a vent slot which is capable of communicating the inside and outside of said hollow cylindrical blank closed at the first end by a bottom, when said hollow cylindrical blank is removed, and an axially movable annular die in the annular cavity surrounding the stationary punch and biased toward the first die for applying pressure on the second end of the blank as it is extruded into the cavity; and a third die set including a first die and a second die opposing to each other and movable relative to each other, thereby to punch out the bottom of the hollow cylindrical blank formed by said second die set, said first die having a hole into which the hollow cylindrical blank can be inserted, and a through hole having a diameter equal to the inner diameter of the hollow cylindrical blank, and said second die having a movable punch capable of punching the bottom of the hollow cylindrical blank said movable punch having a vent slot for preventing air stored in the hollow cylindrical bank from being compressed when said movable punch is inserted into the hollow cylindrical blank.

* * * * *